No. 607,350. Patented July 12, 1898.
R. DITTRICH.
STOP COCK BOX CLEANER.
(Application filed Dec. 6, 1897.)
(No Model.)
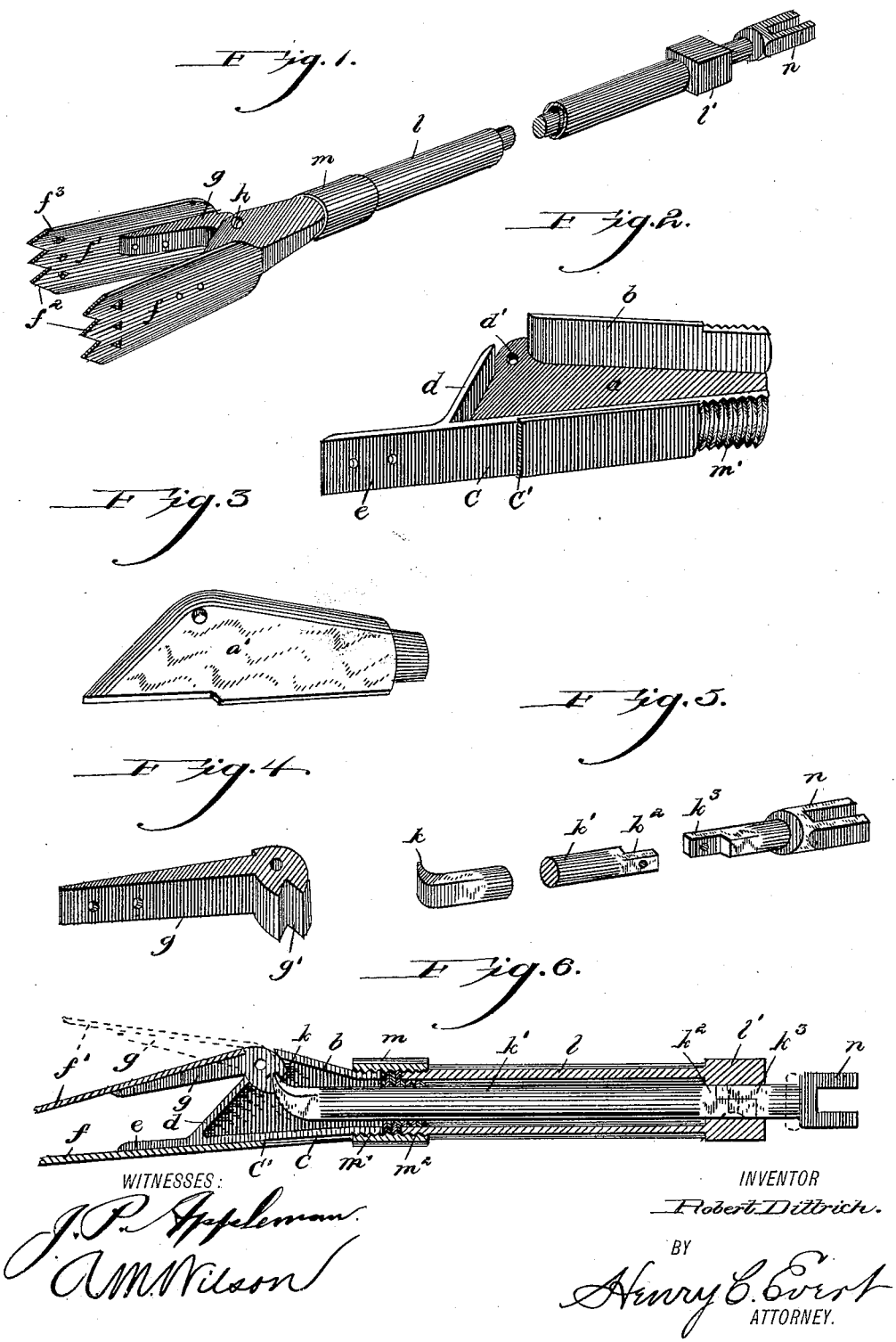
WITNESSES:
J. P. Appleman
A. M. Wilson
INVENTOR
Robert Dittrich.
BY
Henry C. Evert
ATTORNEY.
THE NORRIS PETERS CO., PHOTO-LITHO., WASHINGTON, D. C.

UNITED STATES PATENT OFFICE.

ROBERT DITTRICH, OF PITTSBURG, PENNSYLVANIA.

STOP-COCK-BOX CLEANER.

SPECIFICATION forming part of Letters Patent No. 607,350, dated July 12, 1898.

Application filed December 6, 1897. Serial No. 660,845. (No model.)

*To all whom it may concern:*

Be it known that I, ROBERT DITTRICH, a citizen of the United States of America, residing at Pittsburg, in the county of Allegheny and State of Pennsylvania, have invented certain new and useful Improvements in Stop-Cock-Box Cleaners, of which the following is a specification, reference being had therein to the accompanying drawings.

This invention relates to certain new and useful improvements in stop-cock-box cleaners, and relates more particularly to that class of stop-cocks that are employed at the various connections with the water-main for opening and closing said connection. As is well known, the stop-cocks of these connections are usually located at a point at some distance below the surface and are protected by a box which frequently becomes filled with dirt, so that the stop-cock cannot be operated. My invention aims to provide a device whereby this box may be readily cleaned and the same instrument then employed for opening and closing the cock; and to this end the invention resides in the novel construction, combination, and arrangement of parts to be hereinafter more specifically described, and particularly pointed out in the claims.

In describing the invention in detail reference is had to the accompanying drawings, forming a part of this specification, and wherein like letters of reference indicate similar parts throughout the several views, in which—

Figure 1 is a perspective view of the device partly broken away but showing the parts in their respective positions. Fig. 2 is a perspective view of the jaw-frame with one side removed. Fig. 3 is a similar view of the removable side of said jaw. Fig. 4 is a perspective view of the dog to which the movable shovel is attached. Fig. 5 is a perspective view of the operating-rod and wrench, showing the parts partly broken away and partly disconnected. Fig. 6 is a longitudinal sectional view of the cleaner.

Referring now to the drawings by reference-letters, I will describe the jaw-frame, in which *a* indicates the one side thereof and has formed integral therewith the upper projecting flange *b*, the lower flange *c*, the front flange *d*, and the forwardly-projecting tongue *e*, said lower flange *c* having a shoulder *c'* formed thereon, against which the rear end of the stationary shovel *f* abuts, said shovel being readily secured to the projecting tongue *e*. The flanges *b* and *d* are cut away at their forward end to form an opening *d'*, within which the dog *g* is pivotally secured by a screw or rivet *h* passing through the removable side *a'* of the jaw-frame and engaging in the side *a*. This dog has rigidly attached thereto the shovel *f'* and is enlarged at its pivotal end, so that the same may be provided with a V-shaped groove *g'* to receive the hook end *k* of the operating-rod *k'*. This operating-rod extends rearwardly through the pipe or casing *l*, which is connected to the jaw-frame by means of a sleeve or collar *m*, screw-threaded to engage the threads *m'* and $m^2$ provided therefor on the jaw-frame and casing. The rear end of the rod *k'* is provided with a tenon $k^2$, which matches with a tenon $k^3$, formed on that portion of the rod that carries the wrench *n*, these tenoned ends of the rods being formed square, oblong, or other suitable shape, so as to prevent the same turning within the bushing *l'*, formed on the rear end of the casing *l*. The free ends of the spoons or shovels *f* and *f'* are provided with barbed points $f^2$ and on their inner faces with projecting barbs $f^3$, which serve to hold any material between the two spoons or shovels. The wrench *n*, by which the stop-cock is operated, serves as a handle by means of which the rod *k'* is forced forwardly through the casing *l*, thus causing the hooked point *k* of the same, which is in engagement with the dog, to press upon the same and elevate the spoon or shovel *f'*, as shown in Fig. 6 of the drawings, in which position the spoons may be inserted in the dirt which has accumulated in the box. When the reverse or pull movement is given to the rod, this hook end of the same draws the movable spoon *f'* toward the stationary spoon *f* and binds the dirt firmly between the two, so that it may be lifted out of the box. After the same has been cleaned the wrench end of the device may then be used for operating the stop-cock.

By using the device at all times for operating the stop-cock the box may be readily cleaned every time that the same is opened and accumulation of dirt in the same thereby prevented.

It will also be noted that various changes may be made in the details of construction without departing from the general spirit of my invention.

Having fully described my invention, what I claim as new, and desire to secure by Letters Patent, is—

1. In combination, a jaw-frame, a shovel secured thereto a dog pivotally secured within the frame and carrying a twin shovel, said dog having a groove in one end, to receive the end of an operating-rod to operate the movable shovel, a casing connected to said jaw-frame, substantially as shown and described.

2. In a device of the character described, the combination of the two shovels, one of which is rigidly attached to a movable dog, a groove in one end of said dog to receive the end of an operating-rod, and the other shovel rigidly attached to one side of the frame, substantially as set forth.

In testimony whereof I affix my signature in presence of two witnesses.

ROBERT DITTRICH.

Witnesses:
  JOHN NOLAND,
  H. C. EVERT.